July 5, 1927.
W. KÄSMAIER
DRILL SOCKET
Filed April 1, 1926
1,634,716
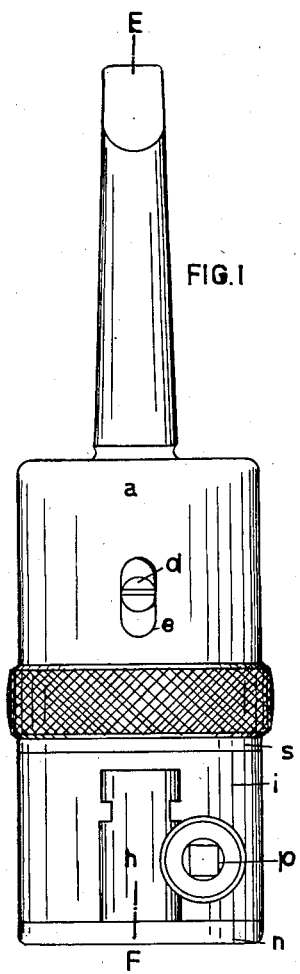
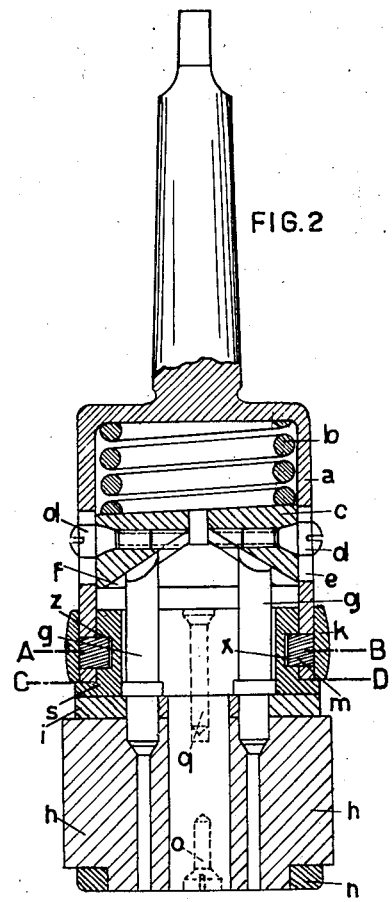
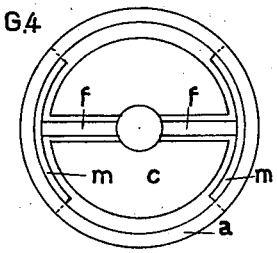
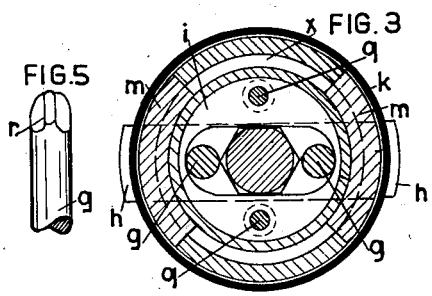

Patented July 5, 1927.

1,634,716

UNITED STATES PATENT OFFICE.

WILHELM KÄSMAIER, OF ESSLINGEN-ON-THE-NECKAR, GERMANY.

DRILL SOCKET.

Application filed April 1, 1926, Serial No. 99,177, and in Germany January 15, 1925.

My invention relates to a drill socket provided with a clutch device subjected to the pressure of a spring and adapted to be thrown into, and out of, operative position. The gist of the invention resides in that the gripping jaws and the device for regulating the spring pressure are connected positively with each other by means of bevelled pins affixed to the gripping jaws. Said pins engage grooves of a disk subjected to the pressure of said spring. Said disc is hollowed out conically at its bottom, and is axially shiftable together with the drill socket casing, said disc being non-rotatory with respect thereto.

The invention is illustrated diagrammatically and by way of example in the accompanying drawing in which Fig. 1 is a side view of the improved drill socket, Fig. 2 a section on the line E—F of Fig. 1, Fig. 3 is a section on the line A—B of Fig. 2, Fig. 4 is a section on the line C—D of Fig. 2, certain parts shown in the other figures, viz., $k$, $s$ and $m$, being omitted so that the drill socket casing is more clearly shown, and Fig. 5 is a side view of one of the pins ($g$) pertaining to the drill socket, the lower end of the pin being broken away.

The drill socket consists of the casing $a$, in one end of which is housed a compression spring $b$, exerting pressure upon a disk $c$ prevented from rotatory motion by means of screws $d$ screwed into said disc, said screws being slidable in longitudinal slots $e$. The disk $c$ can, therefore, be moved only axially in the casing $a$. I wish it to be understood, however, that, although two screws $d$ and two slots $e$ are shown in the drawing, only one screw and one slot will suffice for the purpose stated, and instead of arranging the screw or screws and the slot or slots in the plane of the drawing, as in the example illustrated, said members may be arranged in a plane located at right angles with respect to the plane of the drawing.

The disk $c$ is hollowed out conically at its bottom, and it is provided in the concave conical portion thus formed with transversely bevelled grooves $f$ receiving the corresponding bevelled ends $r$ of strong pins $g$ that are firmly connected with the two jaws $h$ of the drill socket. These jaws can be adjusted in the usual manner by means of a bolt $p$ which is provided with a left-handed thread and with a right-hand thread.

The part $i$ in which the gripping jaws $h$ are located is connected by screws $q$ with an annulus $s$ consisting of red brass and having a circumferential groove $x$ into which extend two arcuate cheeks $m$ $m$ inserted into suitably shaped recesses $z$ of the casing $a$. The whole is covered with a protecting ring $k$ forced thereover. The members $i$ and $s$ may be integral, but it is preferable to manufacture each separately as the member $s$ can then be made of red brass which is less subjected to wear and tear.

The gripping jaws $h$ are prevented from falling out by means of a lower ring $n$ which is fastened to the body $i$ by screws $o$.

The manner of operation is as follows:

When a drill has been attached to the socket and the drilling work is going on, the power is being transmitted to the disk $c$ and, therefore, to the gripping jaws $h$ by the grooves $f$ and the pins $g$. If the load on the drill becomes too great, the disk $c$ and the pins $g$ will be disconnected automatically from each other, because the transversely bevelled ends $r$ of the pins will force the disk $c$ in a direction opposite to that in which the force of the spring $b$ is exerted, thus compressing this latter so much that, finally, the coupling between the disk $c$ and pin ends is interrupted, whereby the jaws $h$ $h$ are permitted to remain stationary, because the segments $m$ $m$ can then rotate freely in the groove $x$ of the member $s$.

Since the grooves $f$ are oblique, as shown, the disk $c$ will be shifted to a higher position when a thicker drill is used. Hence, the compression of the spring $b$ will then be greater. In other words: with thicker drills a greater turning moment is required to cause the socket to run idle, which makes the operation of the device correspond to practical conditions.

I claim:

1. A drill holder comprising in combination a casing, a longitudinally movable disc located within said casing, means connecting said disc to said casing and adapted to restrain a turning movement of said disc, a compression spring located in said casing and operating upon one face of said disc, the other face of said disc having grooves formed therein, said grooves being substantially radial and being also inclined to the longitudinal axis of the casing, radially movable gripping jaws adapted to grip the drill and located in said casing on that side of said disc having said grooves formed therein, and pins connected to said jaws and extending towards said disc, said pins having ends adapted to normally engage said grooves, said pins being movable in unison in all directions with said gripping jaws.

2. A drill socket comprising a casing, radially movable gripping jaws associated with one end of the said casing, a compression spring associated with the other end of the said casing, a disc movable in the direction of the axis of the said casing, said disc being located within the said casing and having one end of the said compression spring abutting one of its faces to force the said disc in a direction towards the said box, means connecting the said disc and the said casing and adapted to prevent any turning movement of the disc and to limit its movement towards the said jaws, the face of the said disc adjacent the said jaws having a conical depression provided with radially extending grooves which are inclined to the axis of the casing, and pins connected to the said jaws and having ends normally extending into the said grooves, the said pins and the said grooves constituting the sole driving connection between said casing and said jaws.

In testimony whereof I affix my signature.

WILHELM KÄSMAIER.